United States Patent
Fujioka et al.

(10) Patent No.: US 9,964,733 B2
(45) Date of Patent: May 8, 2018

(54) HOLDING STRUCTURE FOR HOLDING REFLECTING MIRROR, PROJECTION OPTICAL SYSTEM UNIT, OPTICAL ENGINE, AND IMAGE PROJECTING APPARATUS

(71) Applicants: Tetsuya Fujioka, Kanagawa (JP); Akihisa Mikawa, Kanagawa (JP); Hideo Kanai, Tokyo (JP); Yasunari Mikutsu, Tokyo (JP); Satoshi Tsuchiya, Kanagawa (JP); Takahiro Hiramatsu, Kanagawa (JP); Yukimi Nishi, Tokyo (JP); Jun Mashimo, Tokyo (JP); Yoshito Saito, Kanagawa (JP)

(72) Inventors: Tetsuya Fujioka, Kanagawa (JP); Akihisa Mikawa, Kanagawa (JP); Hideo Kanai, Tokyo (JP); Yasunari Mikutsu, Tokyo (JP); Satoshi Tsuchiya, Kanagawa (JP); Takahiro Hiramatsu, Kanagawa (JP); Yukimi Nishi, Tokyo (JP); Jun Mashimo, Tokyo (JP); Yoshito Saito, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/220,809

(22) Filed: Jul. 27, 2016

(65) Prior Publication Data
US 2017/0031132 A1    Feb. 2, 2017

(30) Foreign Application Priority Data
Jul. 30, 2015    (JP) .................. 2015-150974

(51) Int. Cl.
| G03B 21/28 | (2006.01) |
| G02B 7/182 | (2006.01) |
| G02B 5/10  | (2006.01) |
| G03B 21/00 | (2006.01) |
| G03B 21/14 | (2006.01) |

(52) U.S. Cl.
CPC .............. *G02B 7/182* (2013.01); *G02B 5/10* (2013.01); *G03B 21/008* (2013.01); *G03B 21/142* (2013.01); *G03B 21/28* (2013.01)

(58) Field of Classification Search
CPC ...... G03B 21/28; G03B 21/145; G02B 7/182; G02B 7/1824; G02B 7/185; G02B 5/10; G02B 5/08
USPC ................. 353/98, 99, 77, 78; 359/871, 872
See application file for complete search history.

(56) References Cited

U.S. PATENT DOCUMENTS

| 7,686,458 B2   | 3/2010 | Aizawa et al.  |
| 8,985,786 B2   | 3/2015 | Fujioka et al. |
| 2011/0194035 A1 | 8/2011 | Aizawa et al. |

FOREIGN PATENT DOCUMENTS

| JP | 2000-171897 | 6/2000 |
| JP | 3913265     | 5/2007 |
| JP | 2011-059459 | 3/2011 |

(Continued)

*Primary Examiner* — Ryan Howard
(74) *Attorney, Agent, or Firm* — IPUSA, PLLC (57) ABSTRACT

A holding structure holds a reflecting mirror. The holding structure includes a reflecting mirror bracket holding the reflecting mirror; a protrusion disposed on the reflecting mirror; a protrusion supporting part disposed on the reflecting mirror bracket and supporting the protrusion; and a spacer disposed between the protrusion supporting part and the reflecting mirror bracket.

8 Claims, 9 Drawing Sheets

(56) References Cited

FOREIGN PATENT DOCUMENTS

| | | |
|---|---|---|
| JP | 2011-186434 | 9/2011 |
| JP | 2013-064866 | 4/2013 |

HOLDING STRUCTURE FOR HOLDING REFLECTING MIRROR, PROJECTION OPTICAL SYSTEM UNIT, OPTICAL ENGINE, AND IMAGE PROJECTING APPARATUS

BACKGROUND OF THE INVENTION

1. Field of the Invention

The disclosures herein generally relate to a holding structure for holding a reflecting mirror, a projection optical system unit, an optical engine, and an image projecting apparatus.

2. Description of the Related Art

An image projecting apparatus that uses light from a light source, and generates image light based on image data from a personal computer, a video camera, or the like to project the generated image light on a projection plane such as a screen is known in the related art.

Japanese Unexamined Patent Application Publication No. 2013-64866 discloses an image projecting apparatus. The image projecting apparatus disclosed in Japanese Unexamined Patent Application Publication No. 2013-64866 uses light from a light source, and generates image light. Then, the image projecting apparatus causes a reflecting mirror to reflect the generated image light to project the generated image light on a projection plane.

The reflecting mirror disclosed in Japanese Unexamined Patent Application Publication No. 2013-64866 is held by a reflecting mirror bracket. A structure for holding the reflecting mirror causes the reflecting mirror bracket to rotatably hold the reflecting mirror. In this way, an inclination of the reflecting mirror is adjusted.

In a case where the inclination of the reflecting mirror is adjusted in order to form, on the projection plane, an image of the image light reflected by the reflecting mirror, it may be unable to form the image of the image light on the projection plane when an assembling error of the reflecting mirror or the like is large even if the inclination of the reflecting mirror is adjusted. As a result, quality of the image light may be degraded. For example, color definition of the image light projected on the projection plane may be degraded.

SUMMARY OF THE INVENTION

It is a general object of at least one embodiment of the present disclosure to provide a holding structure for holding a reflecting mirror, a projection optical system unit, an optical engine, and an image projecting apparatus that substantially obviate one or more problems caused by the limitations and disadvantages of the related art.

According to one aspect of the present disclosure, there is provided a holding structure for holding a reflecting mirror. The holding structure includes a reflecting mirror bracket holding the reflecting mirror; a protrusion disposed on the reflecting mirror; a protrusion supporting part disposed on the reflecting mirror bracket and supporting the protrusion; and a spacer disposed between the protrusion supporting part and the reflecting mirror bracket.

DESCRIPTION OF THE PREFERRED EMBODIMENTS

In the following, an embodiment of the present disclosure will be described with reference to the accompanying drawings. An object of the embodiment is to provide a holding structure for holding a reflecting mirror that can suppress degradation in quality of image light reflected by the reflecting mirror.

Figure 1:
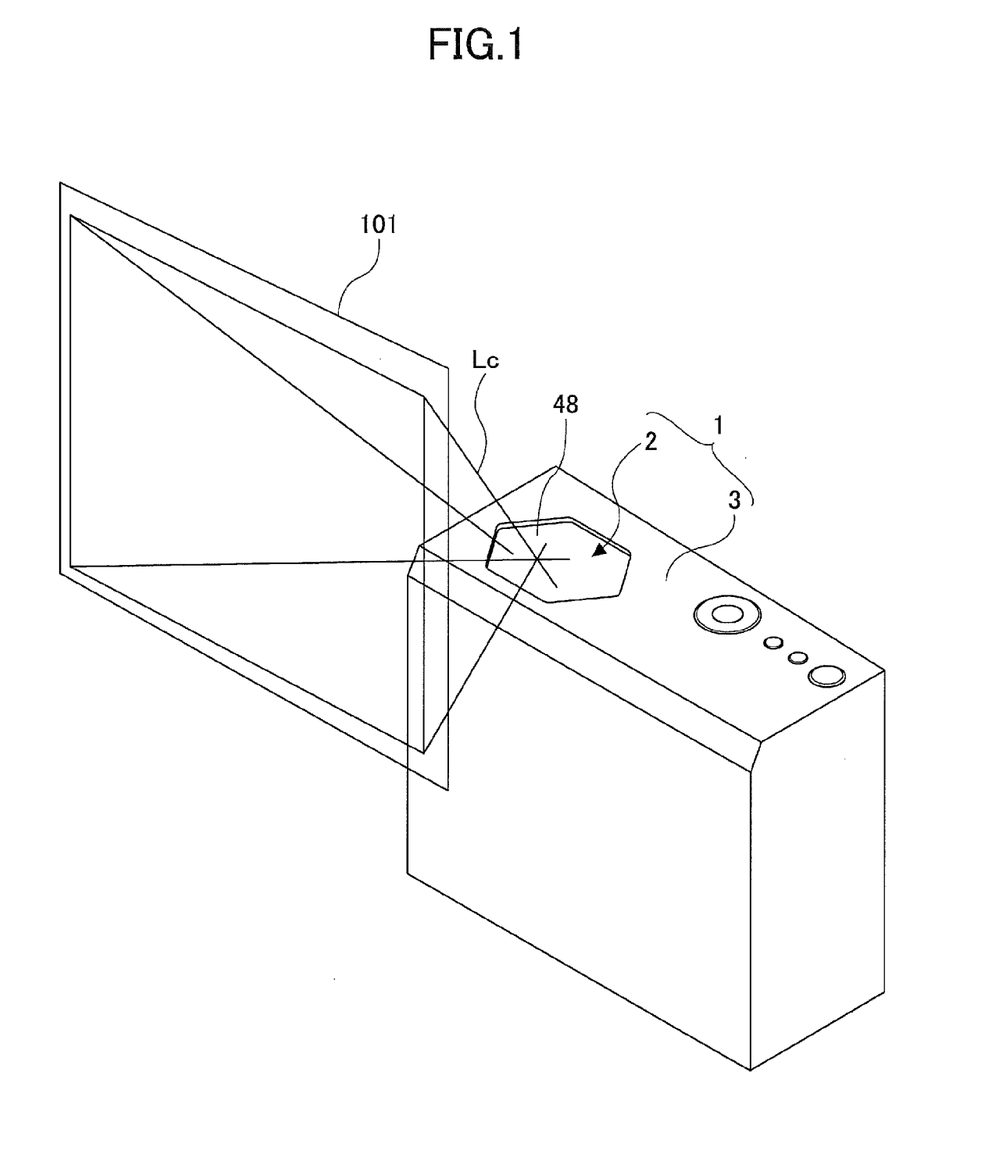
FIG. 1 is a perspective view of an image projecting apparatus in use according to an embodiment of the present disclosure.

FIG. 1 is a perspective view of an image projecting apparatus 1 in use according to an embodiment of the present disclosure. The image projecting apparatus 1 uses light from a light source to generate image light Lc based on image data from a personal computer, a video camera, or the like. The image projecting apparatus 1 projects the generated image light Lc on a projection plane 101 such as a screen arranged in front of the image projecting apparatus 1.

First, a basic configuration of the image projecting apparatus 1 is described. The image projecting apparatus 1 includes an exterior cover 3, an image projecting apparatus body 2 disposed inside of the exterior cover 3, and a power supply board unit attached to the image projecting apparatus body 2.

Figure 2:
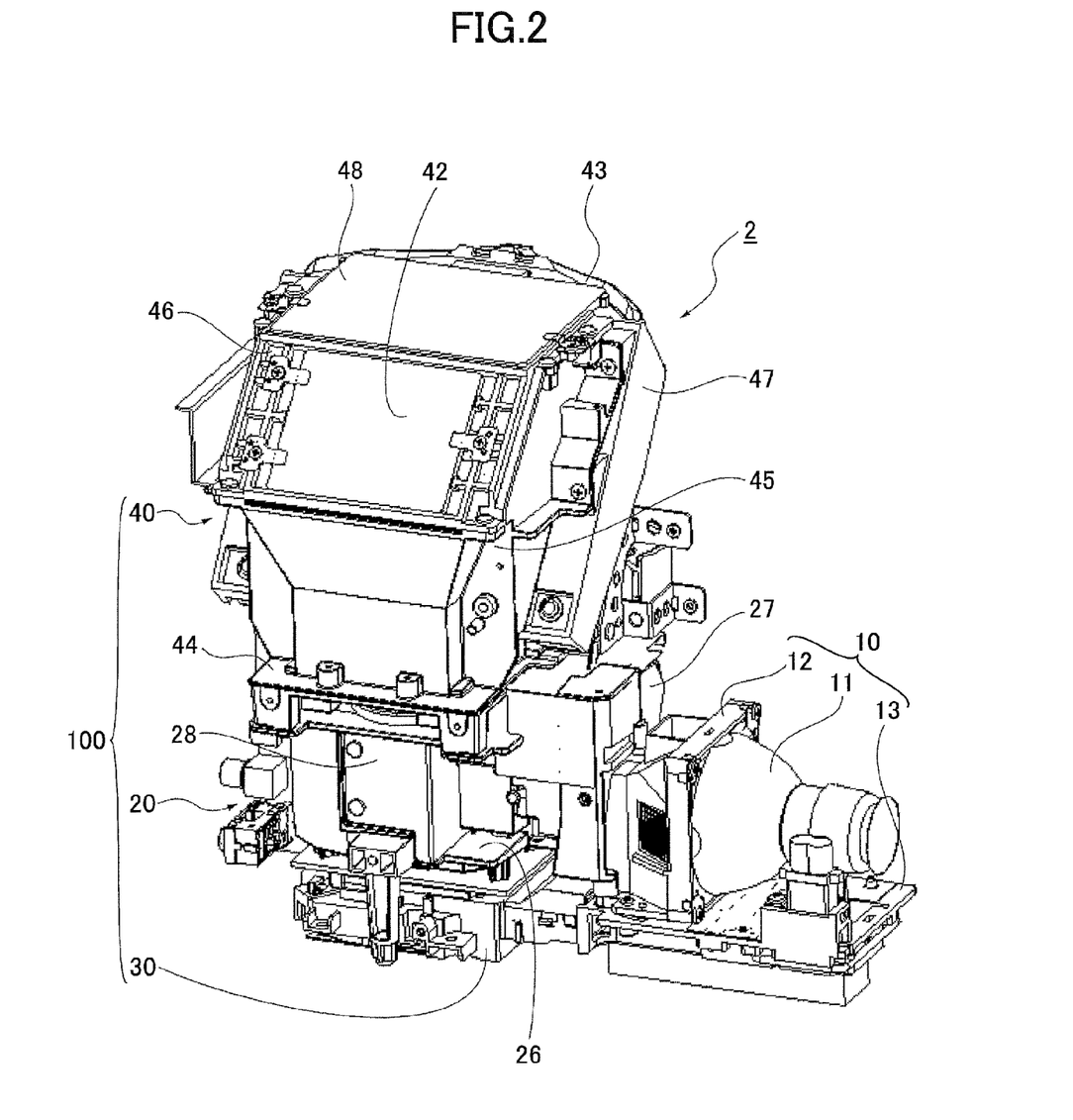
FIG. 2 is a perspective view of an image projecting apparatus body where an exterior cover and a power supply board unit are detached from the image projecting apparatus illustrated in FIG. 1.

FIG. 2 is a perspective view of the image projecting apparatus body 2 where the exterior cover 3 and the power supply board unit are detached from the image projecting apparatus 1 illustrated in FIG. 1. As illustrated in FIG. 2, the image projecting apparatus body 2 includes a light source unit 10 and an optical engine 100 that uses light from the light source unit 10 to generate the image light Lc based on image data. The optical engine 100 projects the generated image light Lc on the projection plane 101.

The optical engine 100 includes an illumination unit 20 that receives the light from the light source unit 10, and an image generating unit 30 that receives the light from the light source unit 10 to generate the image light. Further, the optical engine 100 includes a projection optical system unit 40 that projects, on the projection plane, the image light generated by the image generating unit 30.

Next, configurations of respective units are described.

<Light Source Unit 10>

The light source unit 10 includes a light source 11, a holder that holds the light source 11, a reflector held in the holder 12, and a light source bracket 13 that supports the light source 11 and the holder 12. A halogen lamp, a metal halide lamp, or a high-pressure mercury lamp may be used as the light source 11.

The light source unit 10 uses the reflector to collect the light emitted from the light source 11 to cause the collected light to reach the illumination unit 20.

<Illumination Unit 20>

The illumination unit 20 includes an illumination bracket 26 arranged adjacently to the light source bracket 13, and an optical element group held by the illumination bracket 26.

Figure 3:
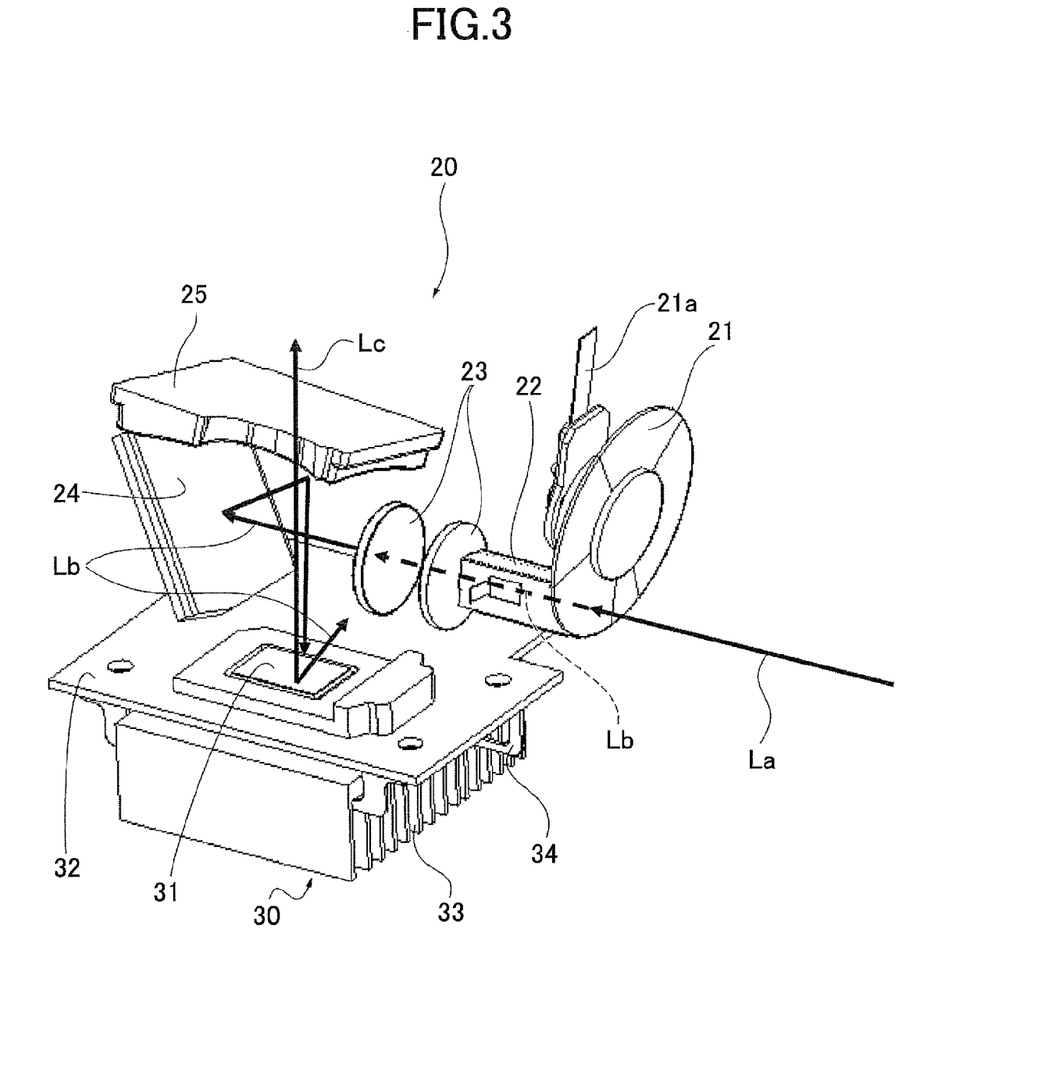
FIG. 3 is a perspective view of an image generating unit and an optical element group of an illumination unit according to the embodiment.

FIG. 3 is a perspective view of the image generating unit 30 and the optical element group of the illumination unit 20. As illustrated in FIG. 3, the optical element group of the illumination unit 20 includes a color wheel 21, a light tunnel 22, two relay lenses 23, a cylinder mirror 24, and a concave mirror 25.

The color wheel 21, the light tunnel 22, the two relay lenses 23, and the cylinder mirror 24 are arranged in the order of incidence of light La from the light source unit 10. The concave mirror 25 is arranged to reflect the reflected light from the cylinder mirror 24 toward the image generating unit 30.

As illustrated in FIG. 2, the illumination bracket 26 includes an illumination cover 27 that covers the color wheel 21 and the light tunnel 22. Further, the illumination bracket 26 includes an OFF optical plate 28.

As illustrated in FIG. 3, the color wheel 21 has a disc shape. The color wheel 21 is secured to a motor shaft of a color wheel motor 21a and rotates. The color wheel 21 is provided with filters of R (red), G (green), B (blue), and/or the like in a rotational direction.

When the light La (white light) emitted from the light source unit 10 reaches a peripheral edge of the color wheel 21, the color wheel 21 rotates to separate the light La into R, G, and B light Lb (Light beams) in time division. The color wheel 21 emits the separated light Lb toward the light tunnel 22.

The light tunnel 22 has a square cylinder shape. The inner peripheral surface of the light tunnel 22 is a mirror surface. The light tunnel 22 reflects the incident light Lb from the color wheel 21 for a plurality of times with the inner peripheral surface of the light tunnel 22 to make the light Lb into a uniform surface light source. Then, the light tunnel 22 emits the uniform surface light source (light Lb) toward the two relay lenses 23.

The two relay lenses 23 transmit the incident light Lb from the light tunnel 22 to emit the light Lb toward the cylinder mirror 24.

The cylinder mirror 24 reflects the light Lb made incident through the two relay lenses 23 toward the concave mirror 25.

The concave mirror 25 reflects the light Lb reflected by the cylinder mirror 24 toward the image generating unit 30.

<Image Generating Unit 30>

As illustrated in FIG. 3, the image generating unit 30 includes a Digital Mirror Device (DMD) 31, which is an image generating element, and a DMD board 32 to which the DMD 31 is attached. The DMD 31 is arranged in a reflection optical path of the concave mirror 25. The DMD board 32 includes a heat sink 33 that diffuses heat. The heat sink 33 is disposed on an opposite side to the DMD 31. The DMD board 32 includes a clamping plate 34. The clamping plate 34 presses the heat sink 33 against the DMD 31 to secure the heat sink 33 to the DMD board 32.

The DMD board 32 includes a driving circuit for driving the DMD 31 based on the image data. When the DMD 31 is driven by the driving circuit, the DMD 31 uses the light Lb reflected from the concave mirror 25 to generate the image light Lc based on the image data. The DMD 31 reflects the generated image light Lc toward the projection optical system 40.

The configuration of the DMD 31 is more specifically described. An image generation surface is formed on the DMD 31. On the image generation surface, a plurality of movable micromirrors are arranged in a lattice pattern. Each micromirror allows the mirror surface to be inclined about a torsion axis by a predetermined angle, and allows the mirror surface to have two states of "ON" and "OFF". When the micromirror is in the "ON" state, the micromirror reflects the light Lb reflected by the concave mirror 25 toward the projection optical system 40 as the image light Lc. When the micromirror is in the "OFF" state, the micromirror reflects the light Lb reflected by the concave mirror 25 toward the OFF optical plate 28 (see FIG. 2). Accordingly, the DMD 31 uses the driving circuit to individually drive each micromirrors to control the emission of the light Lb for each pixel of image data and generate the image light Lc.

<Projection Optical System Unit 40>

Figure 4:
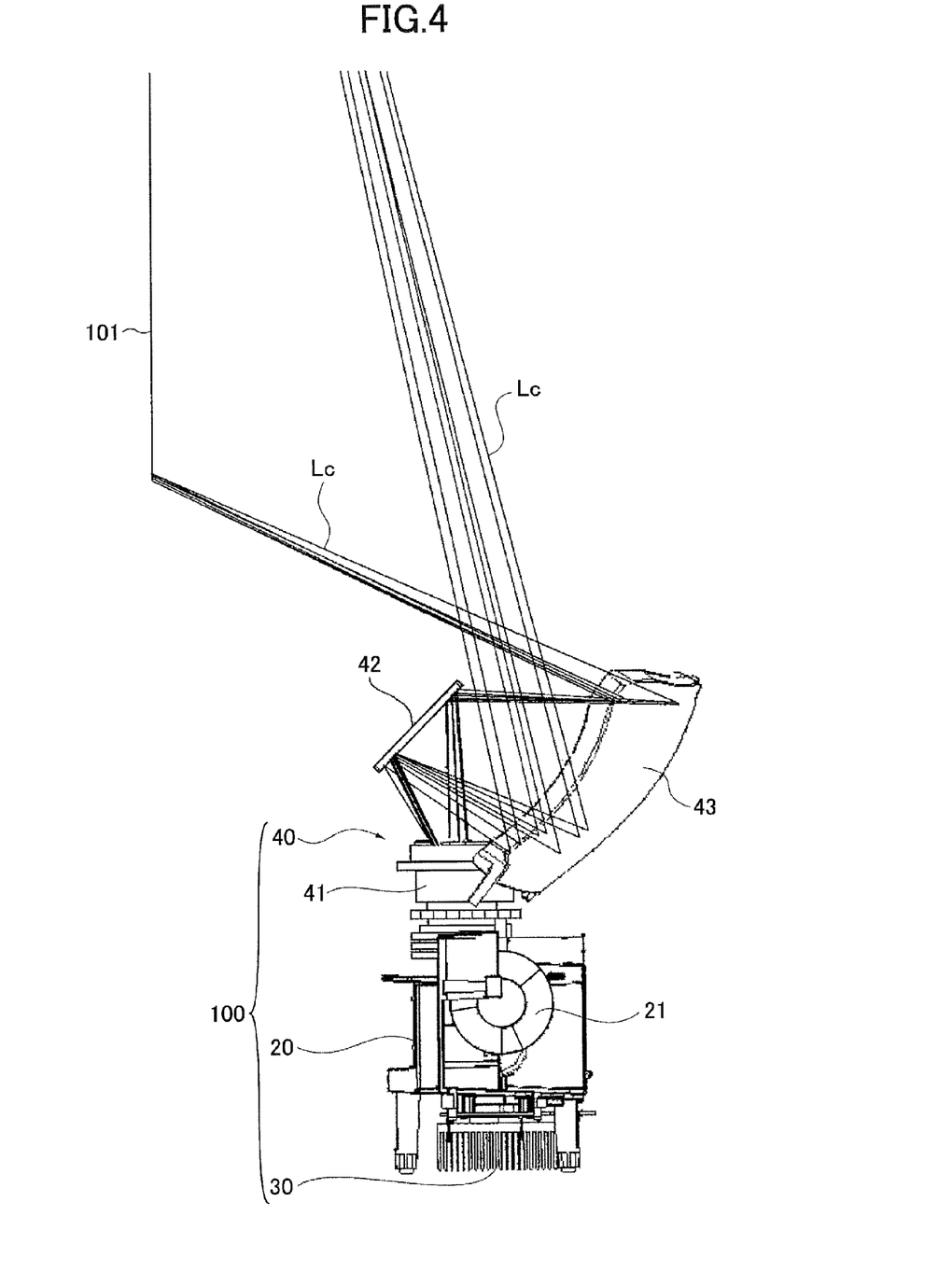
FIG. 4 is a schematic side view of an optical engine viewed from a side of a light source according to the embodiment.

FIG. 4 is a schematic side view of the optical engine 100 viewed from the side of the light source 11. As illustrated in FIG. 4, the projection optical system unit 40 includes a projection lens unit 41, a return mirror 42 arranged on an emission side of the projection lens unit 41, and a curved mirror 43 arranged to face the return mirror 42.

The projection lens unit 41 transmits the incident image light Lc from the image generating unit 30 to enlarge and emit the image light Lc toward the return mirror 42.

The return mirror 42 emits the incident image light Lc from the projection lens unit 41 toward the curved mirror 43.

The curved mirror 43 emits and projects the incident image light Lc from the return mirror 42 on the projection plane 101.

A lens holder 44 illustrated in FIG. 2 holds the projection lens unit 41. The lens holder 44 is secured to the illumination bracket 26. The projection lens unit 41 is covered with a mirror holder 45. The mirror holder 45 is secured to the lens holder 44.

As illustrated in FIG. 2, a mirror bracket 46 holds both ends of the return mirror 42. The mirror holder 45 holds the mirror bracket 46. A free mirror bracket 47 holds the curved mirror 43. The mirror holder 45 holds the free mirror bracket 47.

A transmitting glass 48 is arranged between the return mirror 42 and the free mirror bracket 47. The transmitting glass 48 is used for dust proofing of the optical system components within the image projecting apparatus body 2. The mirror bracket 46 holds both ends of the transmitting glass 48.

Figure 5:
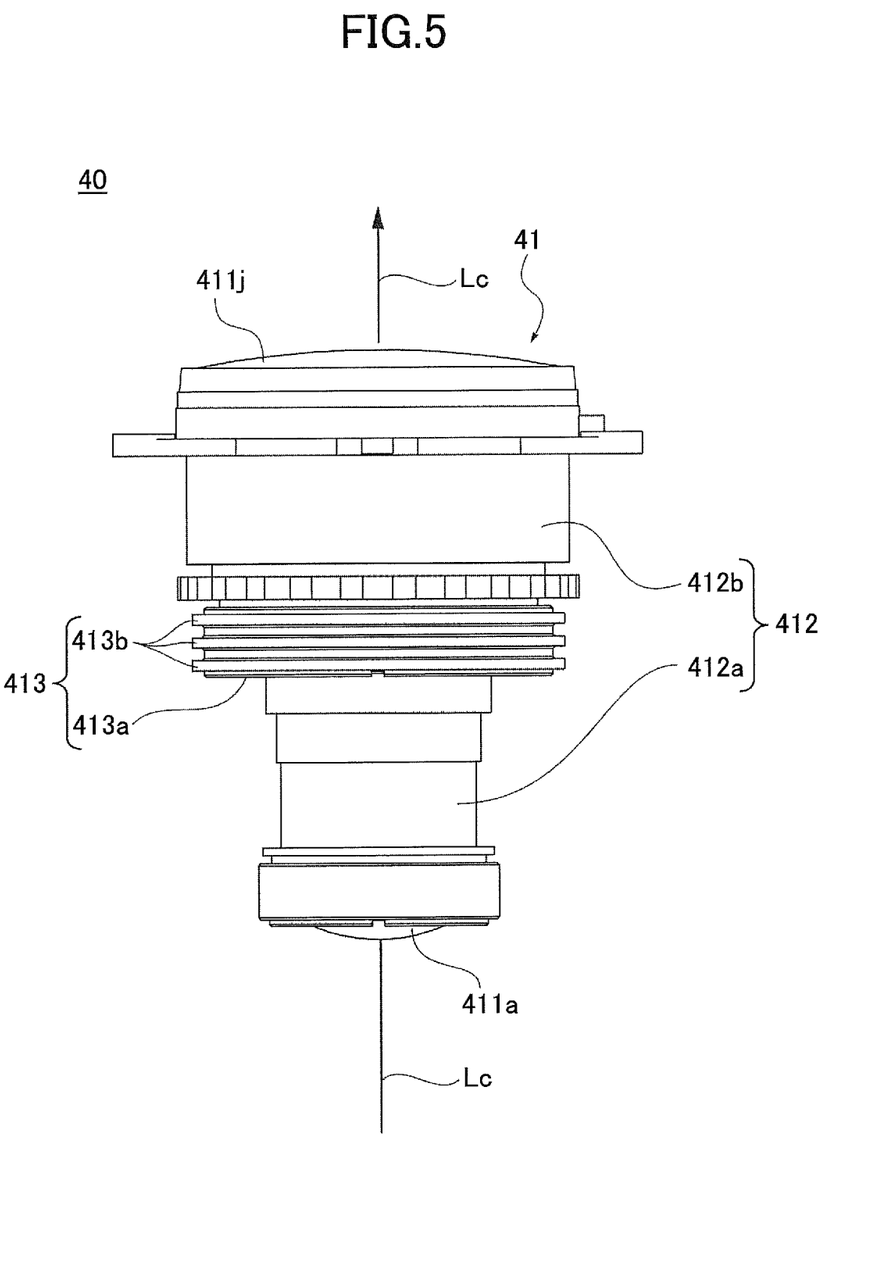
FIG. 5 is a front view of a projection lens unit according to the embodiment.
Figure 6:
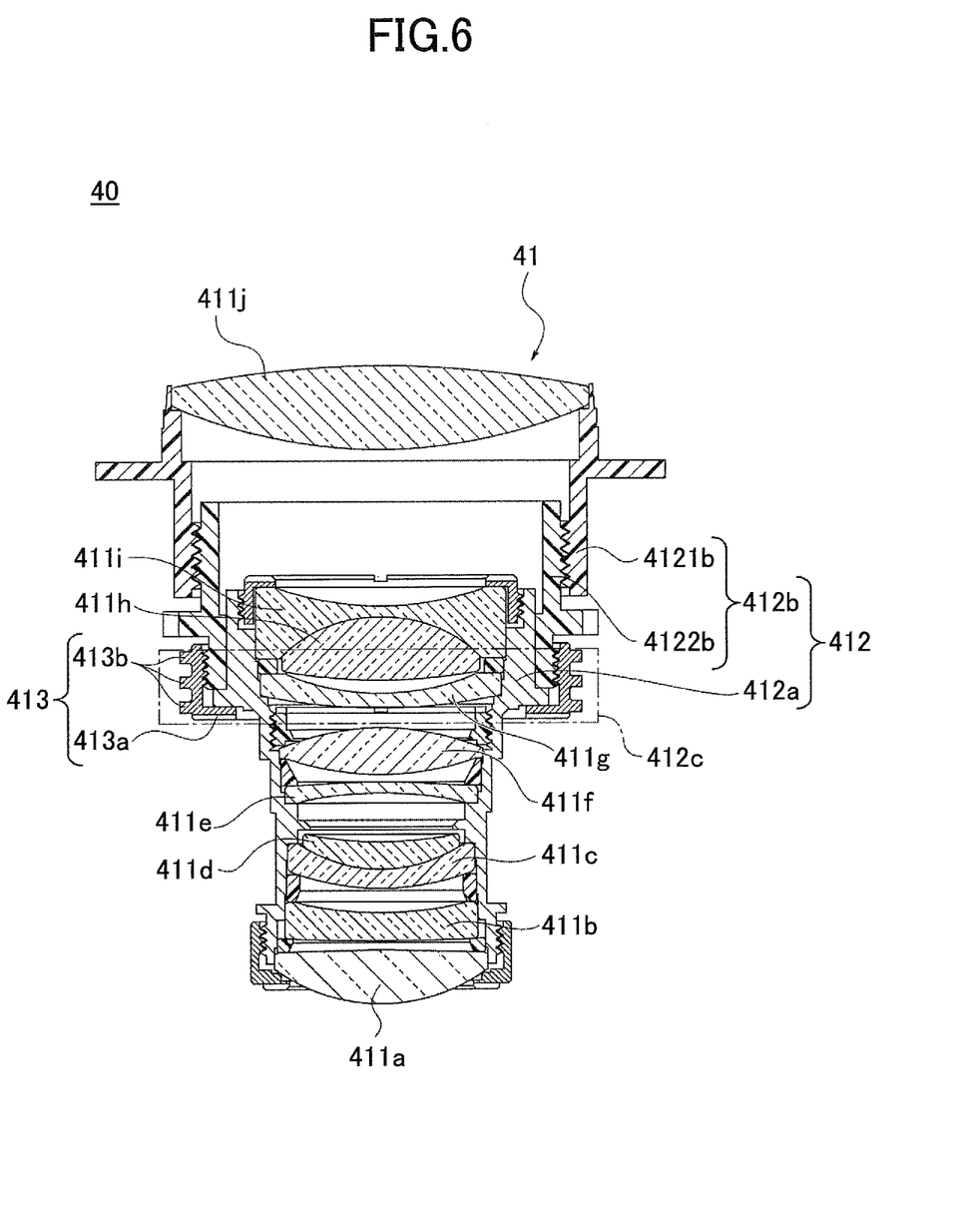
FIG. 6 is a vertical cross-sectional view of FIG. 5.

Next, a specific configuration of the projection lens unit 41 will be described with reference to FIGS. 5 and 6. FIG. 5 is a front view of the projection lens unit 41. FIG. 6 is a vertical cross-sectional view of FIG. 5.

The projection lens unit 41 includes a plurality of projection lenses 411a to 411j, a barrel 412 that holds the plurality of projection lenses 411a to 411j, a heat radiator 413 disposed on the barrel 412. The heat radiator 413 radiates (dissipates) heat of the barrel 412 to the outside.

The plurality of projection lenses 411a to 411j are arranged, between the image generating unit 30 and the return mirror 42, in a line along an optical axis. The plurality of projection lenses 411a to 411j transmit, enlarge and emit the incident image light Lc from the image generating unit 30.

Diameters of the projection lenses 411a to 411i arranged on a side of the image generating unit (incident side of the image light Lc) are set to be smaller than a diameter of the projection lens 411j arranged on a side of the projection plane 101 (emission side of the image light Lc).

The barrel 412 includes an incident side barrel 412a made of metal. The incident side barrel 412a holds the projection lenses 411a to 411j arranged on the incident side among the plurality of projection lenses 411a to 411j. Further, the barrel 412 includes an emission side barrel 412b made of resin. The emission side barrel 412b holds the projection lens 411j arranged on the emission side among the plurality of projection lenses 411a to 411j and contacts the incident side barrel 412a. In other words, the emission side barrel 412b can hold the projection lens 411j arranged on the most emission side among the plurality of projection lenses 411a to 411j and the incident side barrel 412a can hold one or more other projection lenses among the plurality of projection lenses 411a to 411j.

The incident side barrel 412a has a cylindrical shape. A diameter of the incident side barrel 412a is set to be smaller than a dimeter of the emission side barrel 412b. In this way, the incident side barrel 412a is inserted into the emission side barrel 412b, and the peripheral surface of the incident side barrel 412a contacts the emission side barrel 412b.

The emission side barrel 412b includes an outer barrel 4121b that holds the projection lens 411j, and an inner barrel 4122b screwed into the outer barrel 4121b. The incident side barrel 412a is inserted into the inner barrel 4122b, and the incident side barrel 412a contacts the inner barrel 4122b. The outer barrel 4121b and the inner barrel 4122b are barrels made of resin, and have a cylindrical shape.

The heat radiator 413 fits and secures, from the outer side, a contact part 412c between the incident side barrel 412a and the inner barrel 4122b of the emission side barrel 412b. The heat radiator 413 includes an annular member 413a made of metal, and a plurality of radiating plates 413b made of metal. The annular member 413a fits and secures the contact part 412c from the outside. The radiating plates 413b are disposed on a peripheral surface of the annular member 413a.

The annular member 413a has a toric shape. The plurality of radiating plates 413b are arranged, in parallel in an axial direction of the annular member 413a, on the peripheral surface of the annular member 413a. Each of the radiating plates 413b is formed to annularly protrude in a circumferential direction of the annular member 413a on the peripheral surface of the annular member 413a. In other words, the radiating plates 413b protrude outward from the peripheral surface of the annular member 413a.

Figure 7:
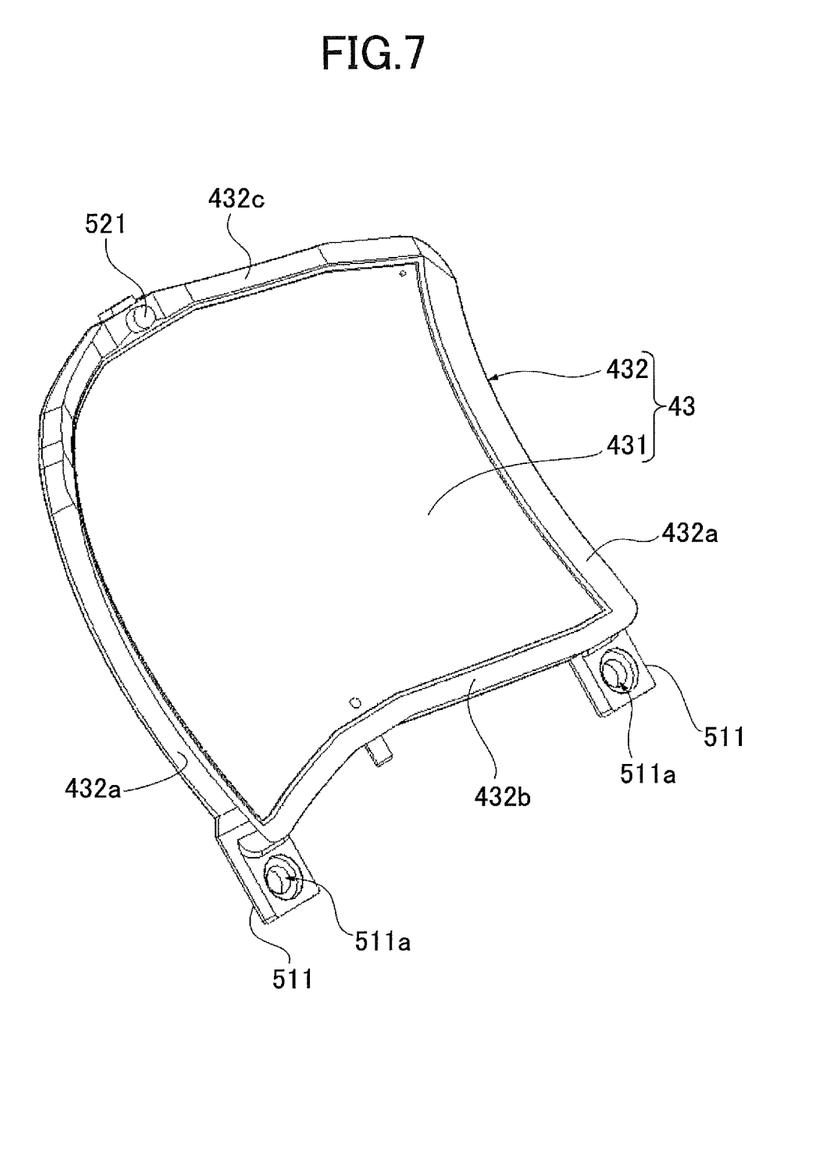
FIG. 7 is a perspective view of a curved mirror according to the embodiment.
Figure 8:
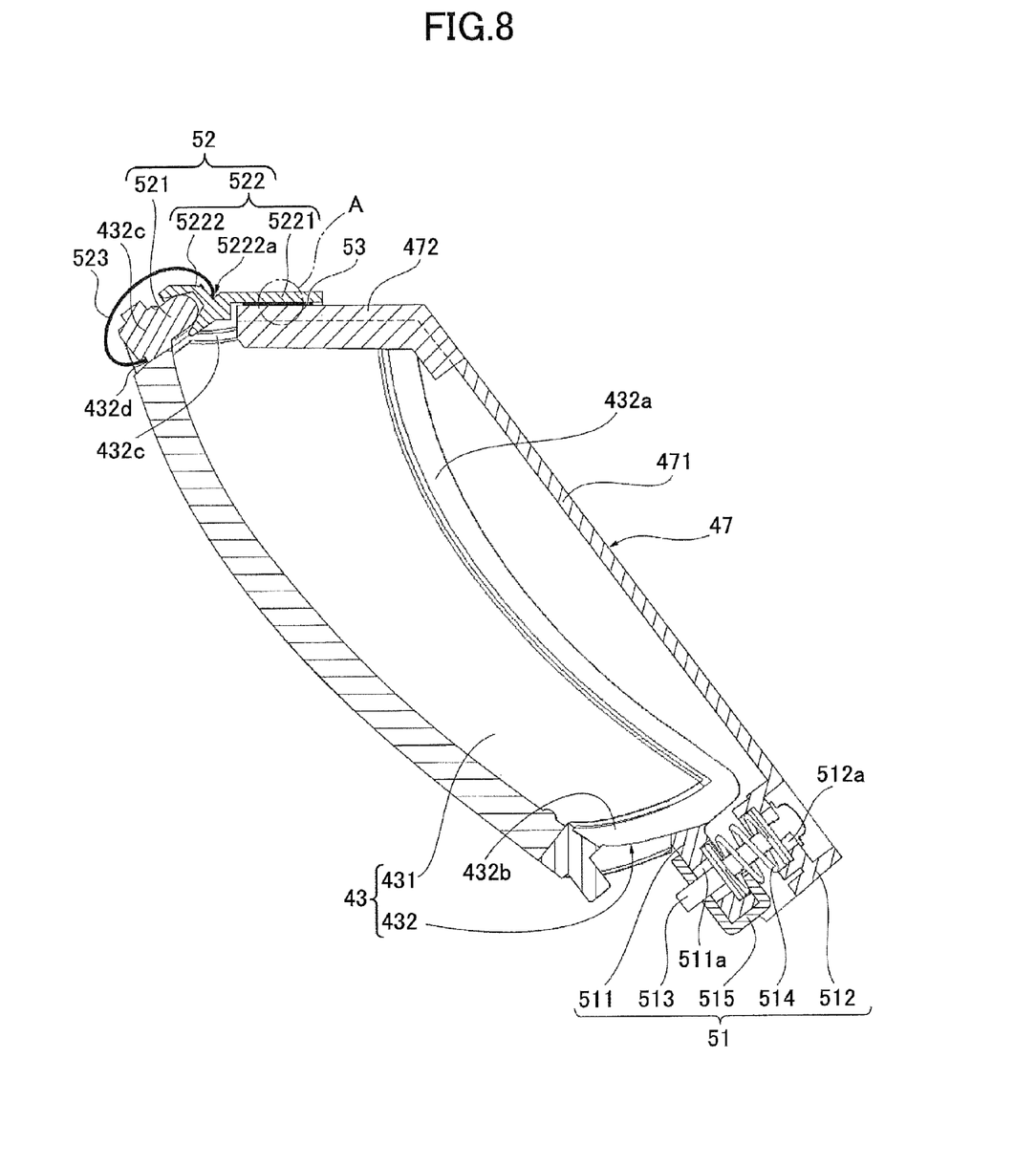
FIG. 8 is a schematic cross-sectional view of a state, viewed from an opposite side to the light source, where a free mirror bracket holds the curved mirror of FIG. 7.

Next, a holding structure for holding the curved mirror 43 (reflecting mirror) is described with reference to FIGS. 7 and 8. FIG. 7 is a perspective view of the curved mirror 43. FIG. 8 is a schematic cross-sectional view of a state, viewed from an opposite side to the light source 11, where the free mirror bracket 47 (reflecting mirror bracket) holds the curved mirror 43 of FIG. 7. First, configurations of the curved mirror 43 and the free mirror bracket 47 are described.

The curved mirror 43 includes a mirror body 431 that reflects the image light Lc, and a frame part 432 disposed on an outer periphery part of the mirror body 431.

The free mirror bracket 47 includes side part holders 471 and 471 that hold left and right side parts 432a and 432a of the frame part 432 of the curved mirror 43 from above. The free mirror bracket 47 also includes an upper part holder 472 that couples the side part holders 471 and 471 to hold an upper part of the frame part 432 from above.

The structure for holding the curved mirror 43 includes a first holder 51. The first holder uses a compression coil spring 514 (elastic member) on a lower side of the free mirror bracket 47 to hold a lower side (one side) of the curved mirror 43. An elastic force of the compression coil spring 514 can be adjusted. Further, the structure for holding the curved mirror 43 includes a second holder 52 that causes an upper side of the free mirror bracket 47 to rotatably hold an upper side (the other side) of the curved mirror 43.

The first holder 51 includes curved mirror side holders 511 and 511, free mirror bracket side holders 512 and 512, two adjusting screws 513, two compression coil springs 514, and two nuts 515.

The respective curved mirror side holders 511 and 511 are disposed left and right sides of a lower part 432b of the frame part 432 of the curved mirror 43. A screw hole 511a into which the adjusting screw 513 is inserted is disposed on each curved mirror side holder 511.

The free mirror bracket side holders 512 and 512 are disposed on a lower part of the left and right side holders 471 and 471 of the free mirror bracket 47. A screw hole 512a into which the adjusting screw 513 is inserted is disposed on each free mirror bracket side holder 512.

The adjusting screw 513 is inserted from the screw hole 512a of the free mirror bracket side holder 512 in a state where the adjusting screw 513 is inserted into the compression coil spring 514. The adjusting screw 513 penetrates both of the screw holes 511a and 512a. The compression coil spring 514 is sandwiched and arranged in a state where the compression coil spring 514 is compressed between the curved mirror side holder 511 and the free mirror bracket side holder 512.

The nut 515 is screwed into (engaged with) a tip part of the adjusting screw 513 penetrating both of the screw holes 511a and 512a, and is secured to the curved mirror side holder 511.

The second holder 52 includes a protrusion 521 disposed on an upper side of the curved mirror 43, a protrusion supporting part 522 disposed on an upper side of the free mirror bracket 47, and a plate spring 523 which is a sandwiching member. The protrusion supporting part 522 rotatably supports the protrusion 521.

The protrusion 521 is disposed on a center part of an upper part 432c of the frame part 432 of the curved mirror 43. The protrusion 521 has a columnar shape. A tip part of the protrusion 521 has a semicircular shape.

The protrusion supporting part 522 is secured to a center part of the upper part holder 472 of the free mirror bracket 47 with a screw. The protrusion supporting part 522 includes a secured part 5221 secured to the upper part holder 472, and a protrusion supporting part body 5222 disposed, at the side of the curved mirror 43, on an edge side of the secured part 5221.

The protrusion supporting part body 5222 has a concave shape in order to rotatably support the protrusion 521. The concave shape of the protrusion supporting part body 5222 can engage with the semicircular shape of the protrusion 521.

Both ends of the plate spring 523 are held by a dent 432d (concave part) disposed on an opposite side to the protrusion 521 on the upper part 432c of the frame part 432, and a dent 5222a (concave part) disposed on a border between the protrusion supporting part body 5222 and the secured part 5221. In this way, the plate spring 523 sandwiches (grips) the protrusion 521 and the protrusion supporting part 522 with the elastic force. In other words, the plate spring 523 elastically holds the protrusion 521 and the protrusion supporting part 522.

Figure 9:
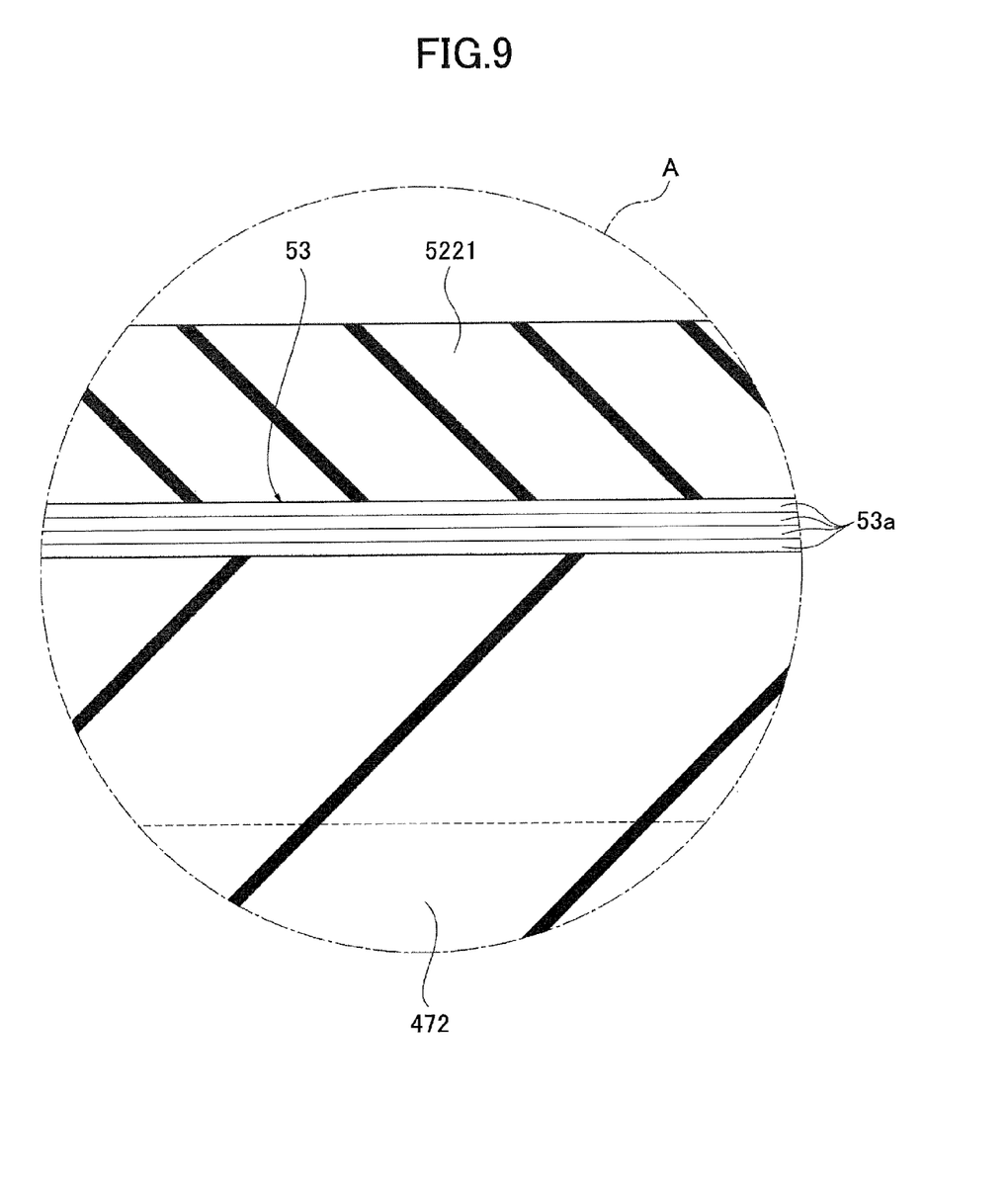
FIG. 9 is an enlarged view of a part A of FIG. 8.

A spacer 53 is disposed between the secured part 5221 of the protrusion supporting part 522 and the upper part holder 472 of the free mirror bracket 47. As illustrated in FIG. 9 (enlarged view of the part A of FIG. 8), the spacer 53 includes a plurality of layered sheets 53a. The number of sheets 53a can be adjusted (changed) by pulling out or inserting the sheets 53a. Thus, a gap between the protrusion supporting part 522 and the free mirror bracket 47 can be adjusted by using the spacer 53.

In the following, processing for projecting an image in the image projecting apparatus 1 configured as described above is described.

The light La from the light source unit 10 reaches the color wheel 21 of the illumination unit 20 and is separated into R, G, and B light Lb by time division. The light Lb is emitted to the light tunnel 22. The light Lb made incident to the light tunnel 22 is made into the uniform surface light source, transmits the two relay lenses 23, and is emitted toward the cylinder mirror 24. The light Lb made incident to the cylinder mirror 24 is reflected toward the DMD 31 of the image generating unit 30 by the concave mirror 25. The light Lb reflected to the DMD 31 is reflected toward the plurality of projection lenses 411a to 411j of the projection optical system unit 40 as the image light Lc based on the image data. The image light Lc made incident to the plurality of projection lenses 411a to 411j transmits the projection lenses 411a to 411j, is enlarged, and is emitted toward the curved mirror 43 by the return mirror 42. The image light Lc made incident to the curved mirror 43 is reflected, transmits the transmitting glass 48, and is projected on the projection plane 101.

Next, a radiating operation of the projection lens unit 41 during the processing for projecting the image is described.

The image light Lc generated by the image generating unit 30 falls on the barrel 412 when entering into and transmitting the projection lenses 411a to 411i. At the contact part 412c between the incident side barrel 412a and the emission side barrel 412b, the heat of the image light Lc is radiated to the outside through the annular member 413a and the plurality of radiating plates 413b. At the incident side barrel 412a, the heat of the image light Lc is radiated to the outside through the incident side barrel 412a.

Next, an adjusting method for adjusting an inclination of the curved mirror 43 during the processing for projecting the image is described.

A user loosens the adjusting screw 513 of the first holder 51 to weaken the elastic force of the compression coil spring 514. The user rotates the curved mirror 43 about the second holder 52 in the vertical direction and adjusts an inclination of the curved mirror 43 of a vertical direction to form the image of the image light Lc (project the image light Lc) on the projection plane 101.

In a case where the image of the image light Lc cannot be formed (projected) on the projection plane 101 even when the inclination of the curved mirror 43 is adjusted in the vertical direction, the user adjusts an inclination of the curved mirror 43 in a horizontal direction. Specifically, the user rotates the curved mirror 43 about the protrusion supporting part body 5222 of the second holder 52 in the horizontal direction to adjust the inclination of the curved mirror 43 in the horizontal direction.

In a case where the image of the image light Lc cannot be formed (projected) on the projection plane 101 even when the inclination of the curved mirror 43 is adjusted in the vertical direction and the horizontal direction, the user adjusts a height position of the curved mirror 43. Specifically, the user adjusts a thickness of the spacer 53 to adjust a height position of the protrusion supporting part 522. Thereby, the user can adjust the height position of the curved mirror 43.

For example, in a case where an image forming position of an upper part of the projection plane 101 is on the near side of the projection plane 101, the user inserts one or more sheets 53a between the secured part 5221 and the upper part holder 472 to thicken the thickness of the spacer 53. In a case where an image forming position of the upper part of the projection plane 101 is on the deeper side (far side) than the projection plane 101, the user pulls out (removes) one or more sheets 53a from the gap between the secured part 5221 and the upper part holder 472 to reduce the thickness of the spacer 53.

Next, advantageous effects of the projection lens unit 41 according to the embodiment are described.

(1) The projection lens unit 41 according to the embodiment includes the plurality of projection lenses 411a to 411j, the barrel 412 that holds the plurality of projection lenses 411a to 411j, and the heat radiator 413, disposed on the barrel 412, that radiates (discharges) the heat of the barrel 412 to the outside.

In this way, the heat of the image light Lc that falls on the barrel 412 is radiated to the outside through the heat radiator 413. Thus, the projection lens unit 41 according to the embodiment can prevent the barrel 412 from being heated by the image light Lc.

Further, by preventing the barrel 412 from being heated, the projection lens unit 41 according to the embodiment can suppress a positional deviation of the projection lenses 411a to 411j due to thermal expansion of the barrel 412 and can suppress degradation of quality of the image light Lc.

(2) In the projection lens unit 41 according to the embodiment, the barrel 412 includes the incident side barrel 412a made of metal and the emission side barrel 412b made of resin, and the heat radiator 413 secures the contact part 412c between the incident side barrel 412a and the emission side barrel 412b.

In this way, the heat of the image light Lc, which falls on the incident side barrel 412a, is radiated to the outside from the incident side barrel 412a. That is, the heat of the image light Lc can be efficiently radiated because the heat of the image light Lc, which falls on the barrel 412, is radiated to the outside from the heat radiator 413 and the incident side barrel 412a. Thus, the projection lens unit 41 according to the embodiment can prevent the barrel 412 from being heated by the image light Lc.

Further, because the diameter of the incident side barrel 412a is smaller than the diameter of the emission side barrel 412b, the incident side barrel 412a becomes hotter than the emission side barrel 412b. In other words, the incident side barrel 412a is easier to become hot than the emission side barrel 412b. In the embodiment, because the metallic barrel is used as the incident side barrel 412a, it becomes possible to certainly prevent the incident side barrel 412a from being heated. Further, because the resin barrel, which is difficult to become hot, is used as the emission side barrel 412b, it becomes possible to reduce a cost and a weight of the barrel 412.

The contact part 412c is a part difficult to radiate heat because the metal (incident side barrel 412a) and the resin (inner barrel 4122b) are in contact with each other. Because the heat radiator 413 is disposed on the contact part 412c, it becomes possible to radiate the heat of the image light Lc from the contact part 412c. Thus, the projection lens unit 41 according to the embodiment can further prevent the barrel 412 from being heated by the image light Lc.

(3) In the projection lens unit 41 according to the embodiment, the heat radiator 413 includes the annular member 413a made of metal and the radiating plate 413b made of metal disposed on the peripheral surface of the annular member 413a.

In this way, because the heat radiator 413 can secure (have) a large surface area, the heat of the image light Lc, which falls on the barrel 412, can be efficiently radiated to the outside. Thus, the projection lens unit 41 according to the embodiment can efficiently prevent the barrel 412 from being heated by the image light Lc.

(4) In the projection lens unit 41 according to the embodiment, the plurality of radiating plates 413b are disposed on the peripheral surface of the annular member 413a.

In this way, because the heat radiator 413 can secure the larger surface area, the heat of the image light Lc, which falls on the barrel 412, can be more efficiently radiated to the outside. Thus, the projection lens unit 41 according to the embodiment can more efficiently prevent the barrel 412 from being heated by the image light Lc.

(5) In the projection lens unit 41 according to the embodiment, the plurality of radiating plates 413b are arranged, on the peripheral surface of the annular member 413a, in parallel in the axial direction of the annular member 413a.

In this way, in a case where a fan disposed on the image projecting apparatus 1 generates cooling air to cool the image projecting apparatus 1 and the generated cooling air flows in the circumferential direction of the annular member 413a, the radiating plates 413b can contact the cooling air without preventing the flow of the cooling air. Accordingly, it becomes possible to use the cooling air to efficiently radiate, to the outside of the image projecting apparatus 1, the heat of the image light Lc radiated from the radiating plates 413b. Thus, the projection lens unit 41 according to the embodiment can more efficiently prevent the barrel 412 from being heated by the image light Lc.

(6) In the projection lens unit 41 according to the embodiment, the radiating plates 413b are formed to annularly protrude in the circumferential direction of the annular member 413a on the peripheral surface of the annular member 413a.

In this way, the radiating plates 413b can secure (have) the large area for contacting the cooling air without preventing the flow of the cooling air. Accordingly, it becomes possible to use the cooling air to efficiently radiate, to the outside of the image projecting apparatus 1, the heat of the image light Lc radiated from the radiating plates 413b. Thus, the projection lens unit 41 according to the embodiment can more efficiently prevent the barrel 412 from being heated by the image light Lc.

Next, advantageous effects of the structure for holding the curved mirror 43 according to the embodiment are described.

(1) The structure for holding the curved mirror 43 according to the embodiment includes the second holder 52 that causes the free mirror bracket 47 to hold the curved mirror 43. The second holder 52 includes the protrusion 521 disposed on the curved mirror 43, and the protrusion supporting part 522, disposed on the free mirror bracket 47, that supports the protrusion 521. Further, the spacer 53 is disposed between the protrusion supporting part 522 and the free mirror bracket 47.

In this way, it becomes possible to rotate the curved mirror 43 about the second holder 52 in the horizontal direction. Thereby, it becomes possible to adjust the inclination of the curved mirror 43 in the horizontal direction. That is, according to the structure for holding the curved mirror 43 of the embodiment, it becomes possible to adjust the inclination of the curved mirror 43 in two axial directions (vertical direction and horizontal direction). Accordingly, it becomes possible to widen an adjustable range of the inclination of the curved mirror 43 in comparison with an adjustable range of the related art.

Further, because the gap (height position of the protrusion supporting part 522) between the protrusion supporting part 522 and the free mirror bracket 47 can be adjusted by the spacer 53, it becomes possible to adjust the height position of the curved mirror 43.

According to the structure for holding the curved mirror 43 of the embodiment, it becomes possible to widen the adjustable range of the inclination in comparison with the adjustable range of the related art, and to adjust the height position of the curved mirror 43. Thus, even if an assembling error of the curved mirror 43 or the like is large, it becomes possible to adjust the height position and the inclination of the curved mirror 43 to certainly form, on the projection plane 101, the image of the image light Lc reflected by the curved mirror 43. Thus, the structure for holding the curved mirror 43 according to the embodiment can suppress degradation in quality of the image light Lc reflected by the curved mirror 43.

(2) Because the protrusion 521 and the protrusion supporting part 522 are used in the second holder 52 of the structure for holding the curved mirror 43 according to the embodiment, it becomes possible to adjust the inclination of the curved mirror 43 in two axial directions with a simple configuration. Thus, it becomes possible to certainly form, on the projection plane 101, the image of the image light Lc reflected by the curved mirror 43 while controlling the cost. Thus, the structure for holding the curved mirror 43 according to the embodiment can suppress the degradation in the quality of the image light Lc reflected by the curved mirror 43 at a low cost.

(3) Because the spacer 53 is used in the structure for holding the curved mirror 43 according to the embodiment, it becomes possible to adjust the height position of the curved mirror 43 with the simple configuration. Thus, it becomes possible to certainly form, on the projection plane 101, the image of the image light Lc reflected by the curved mirror 43 while controlling the cost. Thus, the structure for holding the curved mirror 43 according to the embodiment can suppress the degradation in the quality of the image light Lc at a lower cost.

Because the projection optical system unit 40 according to the embodiment includes the projection lens unit 41, it becomes possible to suppress the degradation in the quality of the image light Lc projected on the projection plane 101.

Further, because the projection optical system unit 40 according to the embodiment includes the second holder 52 that causes the free mirror bracket 47 to hold the curved mirror 43, it becomes possible to suppress the degradation in the quality of the image light Lc projected on the projection plane 101.

Because the optical engine 100 according to the embodiment includes the projection lens unit 41, it becomes possible to suppress the degradation in the quality of the image light Lc projected on the projection plane 101.

Further, the optical engine 100 according to the embodiment includes the DMD 31, the curved mirror 43 that reflects the image light LC generated by the DMD 31 toward the projection plane 101, and the second holder 52 that causes the free mirror bracket 47 to hold the curved mirror 43. In this way, it becomes possible to suppress the degradation in the quality of the image light Lc projected on the projection plane 101.

Because the image projecting apparatus 1 according to the embodiment includes the optical engine 100 that includes the projection lens unit 41, it becomes possible to suppress the degradation in the quality of the image light Lc projected on the projection plane 101.

Further, the image projecting apparatus 1 according to the embodiment includes the light source 11 and the DMD 31 that receives the illumination by the light of the light source 11 to generate the image light Lc. Moreover, the image projecting apparatus 1 according to the embodiment includes the curved mirror 43 that reflects the image light LC generated by the DMD 31 toward the projection plane 101, and the second holder 52 that causes the free mirror bracket 47 to hold the curved mirror 43. In this way, it becomes possible to suppress the degradation in the quality of the image light Lc projected on the projection plane 101.

Although the radiating plates 413b are continuously formed in the circumferential direction on the peripheral surface of the annular member 413a in the projection lens unit 41 according to the embodiment, the radiating plates 413b may be intermittently formed in the circumferential direction on the peripheral surface of the annular member 413a. In this case, because it becomes possible to largely secure the surface area of the heat radiator 413, it becomes possible to efficiently radiate, to the outside, the heat of the image light Lc that falls on the barrel 412. Thus, it becomes possible to efficiently prevent the barrel 412 from being heated by the image light Lc.

In the structure for holding the curved mirror 43 according to the embodiment, the first holder 51 holds the lower side of the free mirror bracket 47 and the curved mirror 43, the second holder 52 holds the upper side of the free mirror bracket 47 and the curved mirror 43. However, the positions of the first holder 51 and the second holder 52 are not necessarily limited to the positions in the embodiment. The first holder 51 and the second holder 52 may be arranged at positions where the curved mirror 43 faces the free mirror bracket 47. For example, the first holder 51 may hold the upper side of the free mirror bracket 47 and the curved mirror 43, and the second holder 52 may hold the lower side of the free mirror bracket 47 and the curved mirror 43.

Although the plurality of sheets 53a constitute the spacer 53 in the structure for holding the curved mirror 43 according to the embodiment, one sheet may constitute the spacer 53. In this case, when the gap between the protrusion supporting part 522 and the free mirror bracket 47 is adjusted, a sheet having a different thickness is prepared to perform replacement. In other words, a sheet inserted into the gap is replaced with another sheet having a different thickness. A plurality of sheets having different thicknesses may be prepared.

In the structure for holding the curved mirror 43 according to the embodiment, the spacer 53 (plurality of sheets 53a) is simply sandwiched and disposed between the secured part 5221 of the protrusion supporting part 522 and the upper part holder 472 of the free mirror bracket 47. Alternatively, each sheet 53a may be formed into a U-shape, hooked on the screw securing the secured part 5221 and the upper part holder 472, and sandwiched and disposed between the secured part 5221 and the upper part holder 472. In this case, because it becomes easy to insert and remove each sheet 53a and possible to increase efficiency of adjusting the thickness of the spacer 53, it becomes possible to increase work efficiency of adjusting the height position of the curved mirror 43.

Further, the present disclosure is not limited to these embodiments, but various variations and modifications may be made without departing from the scope of the present invention.

The present application is based on and claims the benefit of priority of Japanese Priority Application No. 2015-150974 filed on Jul. 30, 2015, with the Japanese Patent Office, the entire contents of which are hereby incorporated by reference.

What is claimed is:

1. A holding structure for holding a reflecting mirror, the holding structure comprising:
   a reflecting mirror bracket holding the reflecting mirror;
   a protrusion disposed on the reflecting mirror;
   a protrusion supporting part disposed on the reflecting mirror bracket and supporting the protrusion;
   a spacer disposed between the protrusion supporting part and the reflecting mirror bracket; and
   a concave-shaped portion formed on the protrusion supporting part, the concave-shaped portion supporting the protrusion,
   wherein a first surface of the spacer is in contact with the protrusion supporting part,
   wherein a second surface of the spacer is in contact with the reflecting mirror bracket, and
   wherein the second surface is opposite to the first surface.

2. The holding structure according to claim 1, wherein the spacer includes one or more sheets.

3. The holding structure according to claim 1, wherein the spacer is removable from a gap between the protrusion supporting part and the reflecting mirror bracket.

4. The holding structure according to claim 1, further comprising a plate spring configured to elastically grip the protrusion and the protrusion supporting part.

5. The holding structure according to claim 1, wherein a tip part of the protrusion has a semicircular shape, and
   wherein the protrusion supporting part has a concave shape engaging with the semicircular shape to rotatably support the protrusion.

6. A projection optical system unit comprising:
   a reflecting mirror bracket holding a reflecting mirror;
   a protrusion disposed on the reflecting mirror;
   a protrusion supporting part disposed on the reflecting mirror bracket and supporting the protrusion;
   a spacer disposed between the protrusion supporting part and the reflecting mirror bracket; and
   a concave-shaped portion formed on the protrusion supporting part, the concave-shaped portion supporting the protrusion,
   wherein a first surface of the spacer is in contact with the protrusion supporting part,
   wherein a second surface of the spacer is in contact with the reflecting mirror bracket, and
   wherein the second surface is opposite to the first surface.

7. An optical engine comprising:
   an image generating element;
   a reflecting mirror configured to reflect image light generated by the image generating element toward a projection plane;
   a reflecting mirror bracket holding the reflecting mirror;
   a protrusion disposed on the reflecting mirror;
   a protrusion supporting part disposed on the reflecting mirror bracket and supporting the protrusion;

a spacer disposed between the protrusion supporting part and the reflecting mirror bracket; and a concave-shaped portion formed on the protrusion supporting part, the concave-shaped portion supporting the protrusion, wherein a first surface of the spacer is in contact with the protrusion supporting part, wherein a second surface of the spacer is in contact with the reflecting mirror bracket, and wherein the second surface is opposite to the first surface.

8. An image projecting apparatus comprising:

a light source;

an image generating element configured to receive illumination by light of the light source to generate image light;

a reflecting mirror configured to reflect the image light generated by the image generating element toward a projection plane;

a reflecting mirror bracket holding the reflecting mirror;

a protrusion disposed on the reflecting mirror;

a protrusion supporting part disposed on the reflecting mirror bracket and supporting the protrusion;

a spacer disposed between the protrusion supporting part and the reflecting mirror bracket; and a concave-shaped portion formed on the protrusion supporting part, the concave-shaped portion supporting the protrusion, wherein a first surface of the spacer is in contact with the protrusion supporting part, wherein a second surface of the spacer is in contact with the reflecting mirror bracket, and wherein the second surface is opposite to the first surface.

* * * * *